US008090594B2

(12) United States Patent
Grant et al.

(10) Patent No.: US 8,090,594 B2
(45) Date of Patent: Jan. 3, 2012

(54) SYSTEMS AND METHODS FOR DIRECTING RECURRING FINANCIAL TRANSFER OPERATIONS

(75) Inventors: William R. Grant, Danville, CA (US); Michael W. Rogers, Berkeley, CA (US); Mary Lou Corrigan, San Francisco, CA (US); Michael F. Gallagher, Orinda, CA (US); Tony A. Muniz, San Francisco, CA (US)

(73) Assignee: The Western Union Company, Englewood, CO (US)

( * ) Notice: Subject to any disclaimer, the term of this patent is extended or adjusted under 35 U.S.C. 154(b) by 2197 days.

(21) Appl. No.: 10/373,578

(22) Filed: Feb. 24, 2003

(65) Prior Publication Data

US 2004/0098328 A1    May 20, 2004

Related U.S. Application Data

(63) Continuation-in-part of application No. 10/302,762, filed on Nov. 22, 2002, and a continuation-in-part of application No. 10/295,769, filed on Nov. 14, 2002.

(60) Provisional application No. 60/423,706, filed on Nov. 4, 2002, provisional application No. 60/423,698, filed on Nov. 4, 2002.

(51) Int. Cl.
*G06Q 40/00* (2006.01)

(52) U.S. Cl. .................. 705/3; 705/35; 705/39
(58) Field of Classification Search .............. 705/38
See application file for complete search history.

(56) References Cited

U.S. PATENT DOCUMENTS

| 5,911,136 | A | * | 6/1999 | Atkins | 705/36 R |
| 6,088,429 | A | * | 7/2000 | Garcia | 379/88.22 |
| 7,050,997 | B1 | * | 5/2006 | Wood, Jr. | 705/36 R |

OTHER PUBLICATIONS

U.S. Appl. No. 10/302,762, filed Nov. 22, 2002, Applicant Grant et al.
U.S. Appl. No. 10/702,123, filed Nov. 4, 2003, Applicant Rogers.
U.S. Appl. No. 10/295,769, filed Nov. 14, 2002, Applicant Moore et al.

* cited by examiner

*Primary Examiner* — Lindsay M Maguire
*Assistant Examiner* — James Vezeris
(74) *Attorney, Agent, or Firm* — Kilpatrick Townsend & Stockton LLP

(57) ABSTRACT

The present invention provides systems and methods for implementing variable financial plans. The methods can include identifying an account, and accessing an account planning tool. Characteristics associated with the account are presented to the account planning tool, and an account plan is developed using the planning tool. Based at least in part on the account plan, a funds transfer is facilitated from a source of funds to the account. Activity in the account is monitored, and the account plan is modified in response to activity detected in the account plan.

7 Claims, 11 Drawing Sheets

Customer Look-Up

Loan Number:

Last Name:

Customer Number:

[ Search ] [ Close ]
[ Help ] [ Select ]

| Customer No. | Customer Name | Account | Loan Number |
|---|---|---|---|
| 90 | DEMAS, MARIANN | 800015924 | 12121221 |
| 12386 | DEMAS, MARIANN | 800013690 | 80013690A |
| 140 | DORA, MICKEY | | |
| 12122 | DUERSCH, CATHY E. | 800015676 | 1500184743 |
| 12147 | DUERSCH, CATHY E. | 800015694 | 1500184743 |
| 12178 | DUERSCH, CATHY E. | 800015716 | 1500184743 |
| 12201 | DUERSCH, CATHY E. | 800015733 | 1500184743 |
| 12227 | DUERSCH, CATHY E. | 800015751 | 1500184743 |
| 12244 | DUERSCH, CATHY E. | 800015763 | 1500184743 |
| 12267 | DUERSCH, CATHY E. | 800015779 | 1500184743 |

48 Records | Selected Row: 1

Figure 3

Loan model calculator - Product Type: 700 Currency Code: USD

Loan Information

- Disbursement Date: 1/11/01
- First Payment Due:
- Payment Term: 15Y

- Payment Frequency:
- Interest Accrual Method: 00
- Loan Points (%): 2.00

— 410

OK
Cancel
Reset
Help

Calculated Values

Enter three values to calculate the fourth value

- Amount Requested:
- Account Term: 15Y

- Interest Rate: 10.00
- Principal And Interest Payment:

— 415

Projected Values

- Odd Days:
- Prepaid Mtg Ins Premium:
- Origination Fees:
- Commitment Fee:
- Prepaid Finance Charge: 0.00

- Total Amount Financed:
- Total Interest:
- Total Finance Charge: 0.00
- Total Note: 0.00
- Maturity Balance:
- Annual Percentage Rate:

AUTHORIZATION ENROLLMENT CARD (SAMPLE)

YES! I want to open the Equity Accelerator® program payment plan. *For greatest savings, return card by June 30th 2002*
Just follow these easy steps to enroll. You can enroll electronically or by mail.

| *To Enroll Electronically:* | *To Enroll by Mail:* |
|---|---|
| 1. Call (800) 803-6646 to Enroll<br>An Equity Accelerator Specialist will answer any questions you have and verify your enrollment information. Call between 9:00 am and 9:00 pm (ET) Monday through Friday.<br><br>2. Provide The Enrollment Passcode<br>By submitting your enrollment passcode electronically through a touch tone phone keypad, you acknowledge that you have read and agree to the Equity Accelerator Program Authorization (other side).<br><br>Your Enrollment Passcode:<br><br>1250 | 1. Fill in the missing information  Reference #__<br>Name: _____<br>Social Security No.: _____<br>Loan No.: _____<br>Home Phone: _____<br><br>2. Enclose a check marked "VOID" (to indicate the account from which your mortgage payments will be automatically transferred) Sign below and mail this card, along with your "Voided" check, in the postage-paid envelope-TODAY!<br><br>3. By signing below, I acknowledge that I have read and agree to the Equity Accelerator Charge Authorization (other side).<br><br>Signature : _____ Date: _____<br><br>1240 |

| 1. Enrollment passcode = "security code"<br>1205 | 2. Enrollment Card = "copy", "paper form"<br>1210   or "other visual display" |

3. "Readily Identifiable as Authorization"
1215

THE EQUITY ACCELERATOR® PROGRAM AUTHORIZATION
Please read carefully and retain for your records.

- I authorize [Sponsor Name] or its authorized representatives and service providers to initiate transfers from my designated account to make monthly payments to my mortgage.
- I understand that before any withdrawals are made from my bank account, I will receive a Welcome Letter specifying the exact dollar amounts and dates for the electronic funds transfers.
- I understand that you will make my regular mortgage payment beginning the month after withdrawals have begun from my designated bank account.
- I understand that the enrollment fee of $295.00 will be automatically taken out of my first extra principal payment, credited interest, additional prepayments I make, from a debit to my account or from the Custodial Account (where funds are held until the mortgage payment is made); and that there is a $5.42 monthly Participation Fee (a portion is collected with each funds transfer).
- The $295.00 Enrollment Fee becomes earned and non-refundable after ninety (90) days from the date on my Welcome Letter. In the event that I terminate the Program after ninety (90) days, I authorize [Sponsor Name] or its authorized representatives and service providers to collect any unpaid, earned Enrollment Fees from the remaining balance in the Custodial Account and, if necessary to collect any remaining Enrollment Fees, to initiate a debit to my designated bank account
- I understand that this Authorization and the Program services undertaken by [Sponsor Name] in no way alter or lessen my obligation under my existing mortgage contract regarding the amount of the monthly payments, when the payments are due, the application of payments, the assessment of late charges or the determination of delinquencies. Therefore I must maintain sufficient funds in my account for collection of my monthly payment.
- I agree to be bound by the Program's Terms and Conditions, which will be mailed to me before any withdrawal of funds.
- I understand that I can terminate this Program by giving [Sponsor Name] written notice at least thirty (30) days in advance of the requested close date.
- I understand that I have ninety (90) days from the date on my Welcome Letter to terminate this Program without Enrollment Fee obligation.

Copyright 2002 Paymap Inc. All rights reserved. "Equity Accelertor" is a registered service mark of Paymap Inc.

Special Requests (Optional):

4. "Clearly and Conspicuously state its terms"
1220

5. "Revoke Authorization"1230

Figure 11

SYSTEMS AND METHODS FOR DIRECTING RECURRING FINANCIAL TRANSFER OPERATIONS

CROSS-REFERENCE TO RELATED APPLICATIONS

The present application is a Continuation-in-Part of U.S. patent application Ser. No. 10/295,769, filed Nov. 14, 2002, entitled "Systems and Methods for Directing Recurring Financial Transfer Operations"; U.S. Pat. No. 7,747,525, filed Nov. 22, 2002 issued Jun. 29, 2010, entitled "Systems and Methods for Customizing Mortgage Characteristics"; U.S. Provisional Patent Application No. 60/423,706, filed Nov. 4, 2002 entitled "Systems and Methods for Directing Recurring Financial Transfer Operations"; U.S. Provisional Patent Application No. 60/423,698, filed Nov. 4, 2002, entitled "Systems and Methods for Authorizing Account Access". Each of the aforementioned patents and patent applications are incorporated herein by reference for all purposes.

BACKGROUND OF THE INVENTION

The present invention relates generally to the field of account customization, and in particular to systems and methods for tailoring account characteristics to the needs of an individual consumer.

Various types of financial products are offered to consumers. Such financial products typically are designed to meet the needs of a broad cross-section of a given market. For example, investment accounts may be offered that include a particular type of equity products and offer dividend reinvestment. Further, such products may even offer a mechanism for transferring-funds to or from the investment account on a periodic basis. However, it is often an investor's responsibility to assure that the proper amount of funds is invested to meet a goal.

Alternatively, loan products are offered with set terms, rates and payments. Thus, a consumer obtains a loan with the most applicable terms, and proceeds to make payments on the loan until the principle amount is satisfied. In many cases, the terms of the loan can be tailored within some limit, but often not sufficient to meet the needs of an individual consumer.

Hence, for at least the aforementioned reasons, there exists a need in the art for systems and methods capable of tailoring existing or "off the shelf" financial products to the needs of individual consumers.

BRIEF SUMMARY OF THE INVENTION

The present invention provides systems and methods for implementing variable financial plans. Such financial plans can be implemented in relation to loans, investments, and other financial accounts that involve recurring funds transfers. The methods can include identifying an account, and accessing an account planning tool. Characteristics associated with the account are presented to the account planning tool, and an account plan is developed using the planning tool. Based at least in part on the account plan, a funds transfer is facilitated from a source of funds to the account. Activity in the account is monitored, and the account plan is modified in response to activity detected in the account plan.

In various embodiments, the source of funds is a bank account. Further, in some of the embodiments, the method additionally includes performing a plurality of funds transfers from the source of funds to the first account in accordance with the account plan. At least one funds transfer occurs prior to modifying the account plan, and another occurs after modifying the account plan. In some cases, the method also includes authorizing access to the source of funds. Such authorization allows for transferring funds from the source of funds to the first account in recurring fashion in the absence of additional authorization.

In some cases, the account is a mortgage account, and monitoring activity in the mortgage account includes identifying a change in one or more characteristics of the mortgage associated with the mortgage account. In other cases, the account is an investment account, and monitoring activity in the investment account includes identifying a change in a projected rate of growth of the investment account.

Other embodiments of the present invention provide methods for directing recurring financial transfer operations. Such methods include preparing an account plan that indicates transferring funds to an account associated with the account plan. An account plan variable is identified, and activity in the account is monitored. Based on the monitoring, the account plan is modified to maintain the identified account plan variable within a range. In some cases, the account is a first account, and the account plan indicates transferring funds from the second account to the first account. In various cases, the method further includes performing a plurality of funds transfers from the second account to the first account in accordance with the account plan. At least one of the funds transfers occurs prior to modifying the account plan, and another occurs after modifying the account plan. In some cases, such funds transfers are performed by a loan maintenance organization. Further, in some cases, the method further involves authorizing access to the first and the second accounts. Such authorization can provide for transferring funds from the second account to the first account in a recurring fashion without requiring additional authorization.

In some instances, an account planning tool is provided. Such an account planning tool is useful for preparing the account plan. In some cases, the planning tool is a mortgage planning tool, while in other cases, the planning tool is an investment planning tool. In various instances, the identified account plan variable is an amount of a periodic funds transfer, while in other instances, the identified account plan variable is a goal. Thus, for example, the account plan variable may be an amount of funds available at a determined future date.

The summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

A further understanding of the nature and advantages of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 3 illustrates a user interface for identifying information associated with an account owner;

FIG. 4 illustrates a user interface for a planning tool used for planning an account customization;

FIG. 11 is a form useful in relation to the method of FIG. 10.

DETAILED DESCRIPTION OF THE INVENTION

Figure 1:
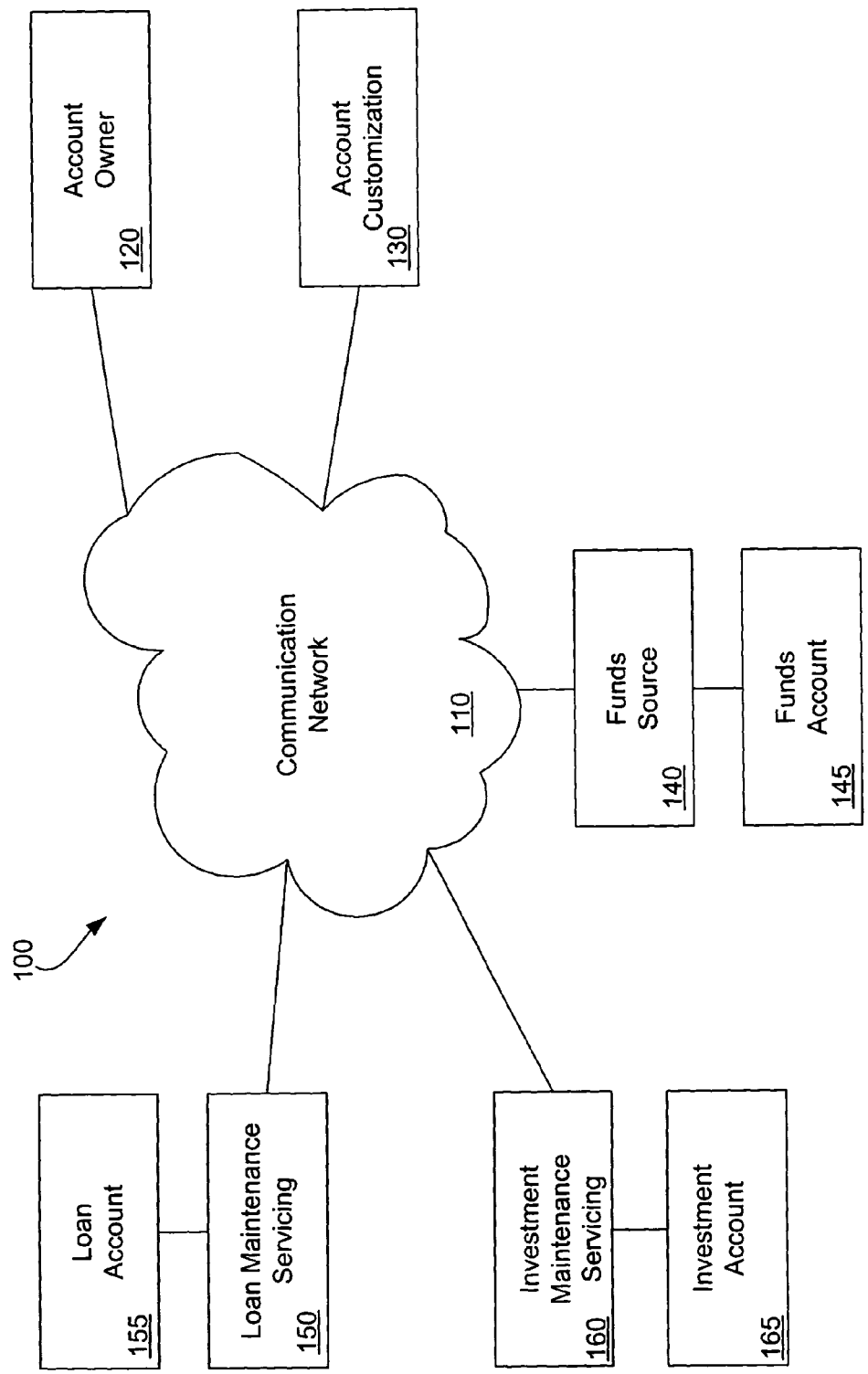
FIG. 1 illustrates a system in accordance with the present invention for authorizing access to, and accessing one or one or more accounts.

Referring to FIG. 1, a system 100 tailored for modifying loans in accordance with various embodiments of the present invention is illustrated. As illustrated, system 100 includes a loan maintenance servicing entity 150 that maintains one or more loan accounts 155; an investment maintenance servicing entity 160 that maintains one or more investment accounts 165; a funds source entity 140 that maintains one or more funds accounts 145; an account owner 120; and an account customization entity 130. Each of the entities, including account owner 120, can communicate via a communication network 110.

Communication network 110 can be any medium capable of facilitating communications between the aforementioned entities. Further, communication network 110 can be a single communication medium or a combination of communication media. In some embodiments, communication network 110 is the Internet providing message based communication between the various entities. In other embodiments, communication network 110 comprises a TCP/IP compliant virtual private network (VPN). In yet other embodiments, communication network 110 includes the Internet for communication between account customization entity 130 and account owner 120, and a VPN for facilitating communications between account customization entity 130 and either or all of funds source entity 140, investment maintenance servicing entity 160, and/or loan maintenance servicing entity 150. However, it should be recognized that other communication networks could be used to provide similar functionality. For example, communication network 110 can be a local area network (LAN), a wide area network (WAN), a telephone network, a cellular telephone network, a virtual private network (VPN), the Internet, an optical network, a wireless network, or any other similar communication network or combination thereof.

Funds source entity 140 can be any entity that maintains one or more sources of funds for account owner 120. In one particular embodiment, funds source 140 is a traditional bank that maintains funds account 145, such as a savings and/or checking account for account owner 120. In another embodiment, funds source entity 140 is an investment firm, such as a stock broker, that maintains an funds account 145, such as a stock trading account and/or mutual fund for account owner 120. Other types of funds source entities 140 and/or funds accounts 145 are possible in accordance with the present invention. For example, in some embodiments, funds account 145 can be any account subject to either or both of Regulation E (12 C.F.R. §205.10(b)) and/or National Automated Clearing House Association ("NACHA") Operating Rules.

Loan maintenance servicing entity 150 can be any entity that maintains and/or services loans and/or credit accounts. In one particular embodiment, loan maintenance servicing entity 150 is a mortgage company or a mortgage servicing company that maintains and/or services loan account 155, such as a mortgage account for which account owner 120 is liable. Alternatively, in other embodiments, loan maintenance servicing entity 150 is a provider of revolving credit lines, and loan account 155 is a revolving credit line for which account owner 120 is liable. Based on the disclosure provided herein, one of ordinary skill in the art will recognize other such loan maintenance servicing entities 150, and/or loan accounts 155 associated therewith.

Investment maintenance servicing entity 160 can be any entity that maintains and/or services investment accounts. In one particular embodiment, investment maintenance servicing entity 160 is a mutual fund company that maintains and/or services investment account 165, such as a mutual fund account owned by account owner 120. Alternatively, in other embodiments, investment maintenance servicing entity 160 is a stock broker or insurance provider that maintains an investment account 165, such as an insurance policy or equity account for account owner 120. Based on the disclosure provided herein, one of ordinary skill in the art will recognize other such investment maintenance servicing entities 160, and/or investment accounts 165 associated therewith.

Account customization entity 130 can be any entity capable of interacting with any or all of account owner 120, investment maintenance servicing entity 160, loan maintenance servicing entity 150, and/or funds source 140 to modify the standing of any or all of funds account 145, investment account 165, and/or loan account 155. In some embodiments, account customization entity 130 receives funds from funds account 145 under the direction of account owner 120. Such funds are distributed to either or both of investment account 165 and/or loan account 155 to satisfy a financial plan implemented in relation to the accounts. In various cases, account customization entity 130 provides tools and/or expertise for developing such a financial plan. In some embodiments, account customization entity 130 is a third party apart from either account owner 120, investment maintenance servicing entity 160, and loan maintenance servicing entity 150. In other embodiments, account customization entity 130 is part of one of the other entities 150, 160 and provides services directed to the products offered by the entity to which account customization entity 130 is associated.

Figure 2:
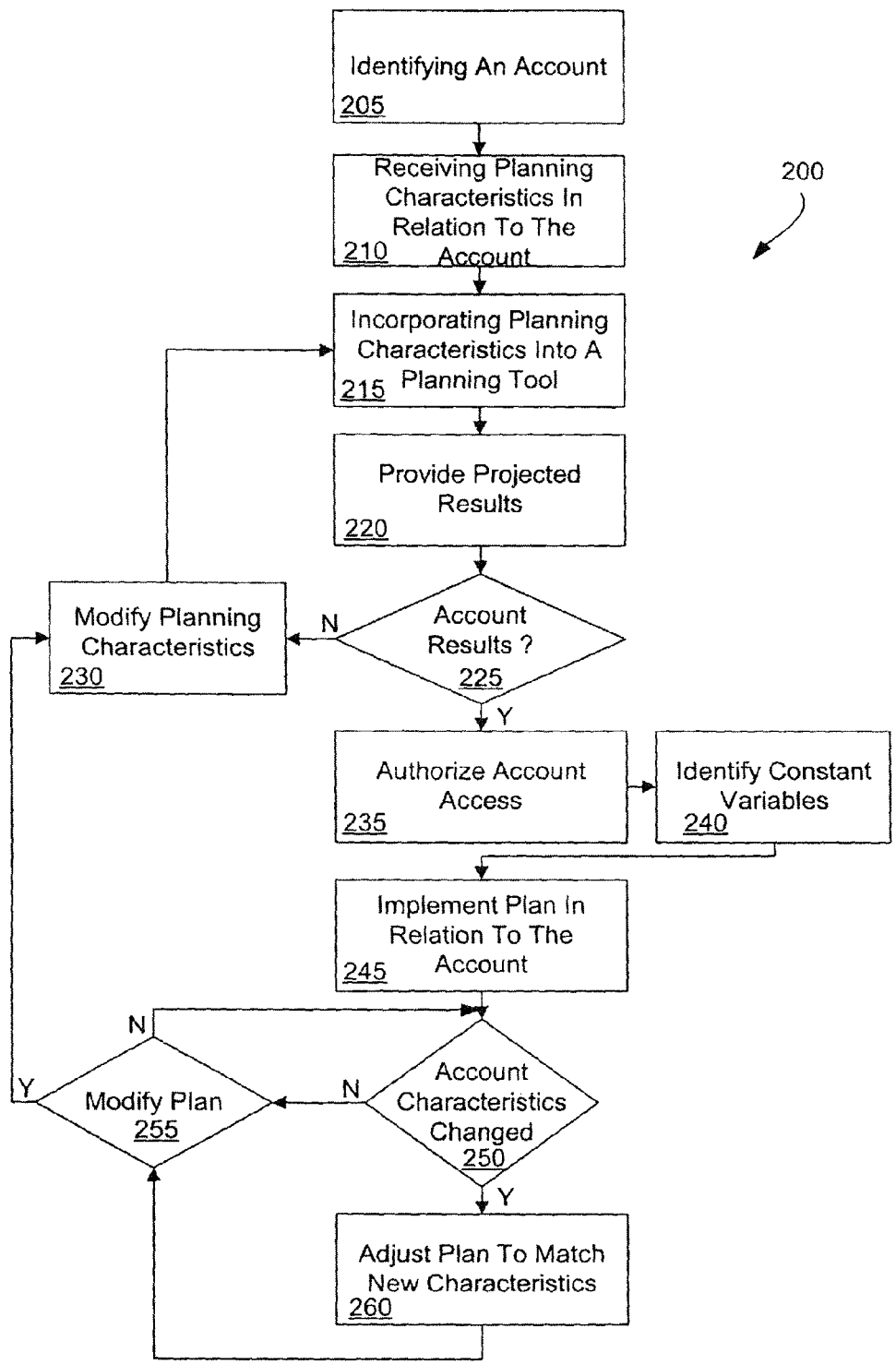
FIG. 2 is a flow diagram illustrating a method in accordance with the present invention for customizing an account, such as a loan account or an investment account.

Referring to FIG. 2, a flow diagram 200 illustrates an embodiment according to the present invention. Following flow diagram 200, an account, such as loan account 155 or investment account 165, is identified (block 205). Identifying the account can include receiving identification information from account owner 120. Such information can include the account number, an indication of loan maintenance servicing entity 150 or investment maintenance servicing entity 160 associated with the account, and the terms associated with the account. Thus, for example, where the account is a mortgage account, the identification information received from account owner 120 can include the entity servicing the mortgage, the account number of the mortgage, the beginning and outstanding principal amounts, the term of the mortgage, the beginning date of the mortgage, the interest rate of the mortgage, information regarding any variability of the interest rate, any escrow amounts associated with the mortgage, and the payment due dates.

In other embodiments, identifying the account is done by requesting account information from loan maintenance servicing entity 150 or investment maintenance servicing entity 160 based on limited information gathered from account owner 120. For example, account owner 120 can identify investment servicing entity 160, and the account number of investment account 165. In turn, investment maintenance servicing entity 160 can be contacted to obtain various details of investment account 165, such as, balance, average return, holdings, account types, any planning information associated with the account, and the like. As another example, account owner 120 may identify loan maintenance servicing entity 150 and provide a personal identification number, such as a social security number. In turn, this information can be used to contact loan maintenance servicing entity 150 to identify loan account 155 associated with account owner 120, and various information associated with loan account 155.

In yet another embodiment, the account is identified from records maintained by account customization entity 130. Such an approach is particularly useful where account owner 120 has had previous interaction with account customization entity 130. Using such an approach, information about account owner 120 and a previously identified account can be quickly accessed without requiring access to loan maintenance servicing entity 150 or investment maintenance servicing entity 160, and the access can be accomplished based on minimal information from account owner 120. Thus, the account can be identified by account owner 120, by accessing one of loan account servicing entity 150 or investment account servicing entity 160, or by using a combination of identification information available from account owner 120 and entities 150, 160. Based on the disclosure provided herein, one of ordinary skill in the art will recognize various approaches for identifying the account that are within the scope of the present invention.

Referring to FIG. 3, a user interface 300 illustrates a tool used by account customization entity 130 to identify an account. User interface 300 includes an input field 320 where information about an account to be identified is provided. In some embodiments, input information can include an account number or portion thereof, a last name of account owner 120 or portion thereof, and/or a customer number or portion thereof. As illustrated, inputting the letter "D" into the last name field and selecting the search key. This causes all accounts previously known to account customization entity 130, where the account owner's last name starts with the letter "D" to be displayed as a list in a field 310. From this point, account owner 120 is identified from the list and selected. It should be noted that various methods exist for obtaining account information from information maintained by account customization entity 130.

Referring again to FIG. 2, planning characteristics are received in relation to the identified account (block 210). In some embodiments, such planning characteristics can be received from account owner 120, and represent the progression of the account desired by the owner. Thus, for example, where the account is a mortgage account, the planning characteristics can include a desired date to payoff the mortgage, a desired monthly payment amount, a desired payment period, and/or combinations thereof or the like. As another example, where the account is an investment account, the planning characteristics can include a desired amount, a date to reach a desired amount, a periodic investment amount, a desired investment period whether it be fixed or variable, and/or combinations thereof or the like.

Further, such planning characteristics can be downloaded from one or more tools used by account owner 120 to implement a financial plan. Thus, for example, account owner 120 may use QUICKEN™ by INTUIT™ to formulate a financial plan. The formulated financial plan can then be downloaded from QUICKEN™ to account customization entity 130, and implemented by account customization entity 130 as further detailed below. Of course, based on the disclosure provided herein, one of ordinary skill in the art will recognize a variety of other financial planning tools that may be used in accordance with the present invention to provide one or more planning characteristics associated with the identified account.

In other embodiments, the planning characteristics can be identified via a financial planning product maintained by account customization entity 130. Such a financial planning product can be interactively operated by a potential customer and a representative of account customization entity 130. Such a product can provide various features offered by typical loan calculation tools and/or investment planning tools.

FIG. 4 illustrates an interface of a financial planning product 400 tailored to planning loans that is useful in relation to various embodiments of the present invention. Financial planning product 400 includes a loan information field 410, a calculated values field 415, and a projected values field 420. In loan information field 410, a customer can enter attributes of a desired loan including, but not limited to, the disbursement date of the loan, a due date of the first payment, the overall term of the loan, the period of loan payments, an interest accrual method, and/or any money available to purchase loan points. Calculated values field 415, includes fields for accepting a loan amount, a term of the loan, an interest rate of the loan, and a principal and interest payment on the loan. As noted, a customer can enter any three of the values and have the fourth value calculated. Projected values field 420 includes various amounts calculated based upon previously populated fields. Using planning product 400, a customer can modify one or more parameters associated with a loan to get a desired loan product tailored to the specific needs of the customer.

In some cases, the desired loan product will be a newly originated loan, whereas in other cases, the desired loan product will be overlaid on an existing loan product to tailor the existing loan product to the characteristics identified using financial planning product 400. In some such overlaid situations, a third party, such as account customization entity 130, can gather money from a customer and satisfy a loan held by another party in accordance with the desired characteristics provided by the customer via financial planning product 400.

Figure 5:
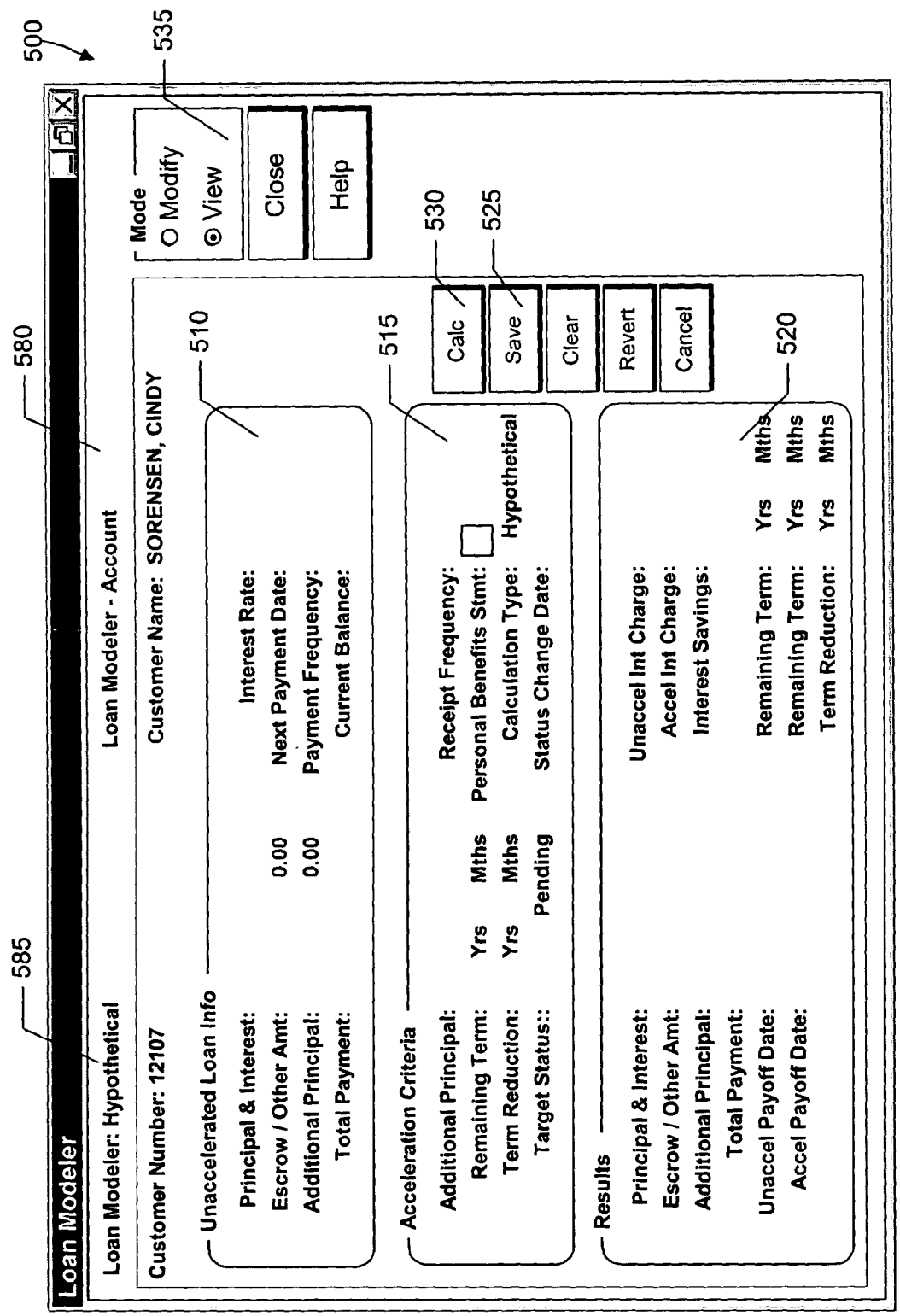
FIGS. 5-8 illustrate another user interface for a planning tool used for planning an account customization in accordance with the present invention.

FIG. 5 illustrates another financial planning product 500 again tailored for planning acceleration of a given loan. Financial planning product 500 includes a hypothetical modeling interface 585 and an account modeling interface 580. Further, financial planning product 500 includes a field 535 to select either modification or monitoring of an account. In the modify mode, planned characteristics can actually be implemented to customize a loan at issue. Alternatively, in the view mode, a number of what if scenarios can be developed, but not implemented as part of any loan. Financial planing product 500 includes a basic loan field 510, a acceleration criteria field 515, and a results field 520.

Basic loan field 510 includes input fields where information about an existing or proposed loan can be entered. Such fields can include, but are not limited to, principal and interest payment information, escrow information, additional principal payment information, total payment, interest rate, next payment date, payment period, and/or current principal balance. Of note, in some embodiments, various of the fields can be calculated based on other fields.

Acceleration criteria field 515 includes various fields associated with accelerating the loan identified in basic loan field 510. The various fields can include additional principal payments, remaining term of the loan, time of reduction of the loan, payment periods, and others. Using these fields, a customer can modify the term and payments of the basic loan. To do so, the customer identifies various planning characteristics to be associated with the basic loan to create the customized loan. Thus, for example, a customer may choose to add an additional principal payment as the planning characteristic. From this, the remaining term and term reduction can be calculated. Alternatively, a customer may choose to maintain the same payment, but modify the frequency of the payment. Again, from this, the term of the loan and term reduction can be calculated. As yet another example, a customer may choose a fixed end point for the loan and adjust the remaining term accordingly. Form this, either or both of the payment period and additional principal amount can be adjusted to make the desired end point reality. Further, a customer can adjust a combination of principal payment and payment period, principal payment and remaining term, or payment frequency and remaining term, from which the remaining variables can be calculated.

Figure 6:
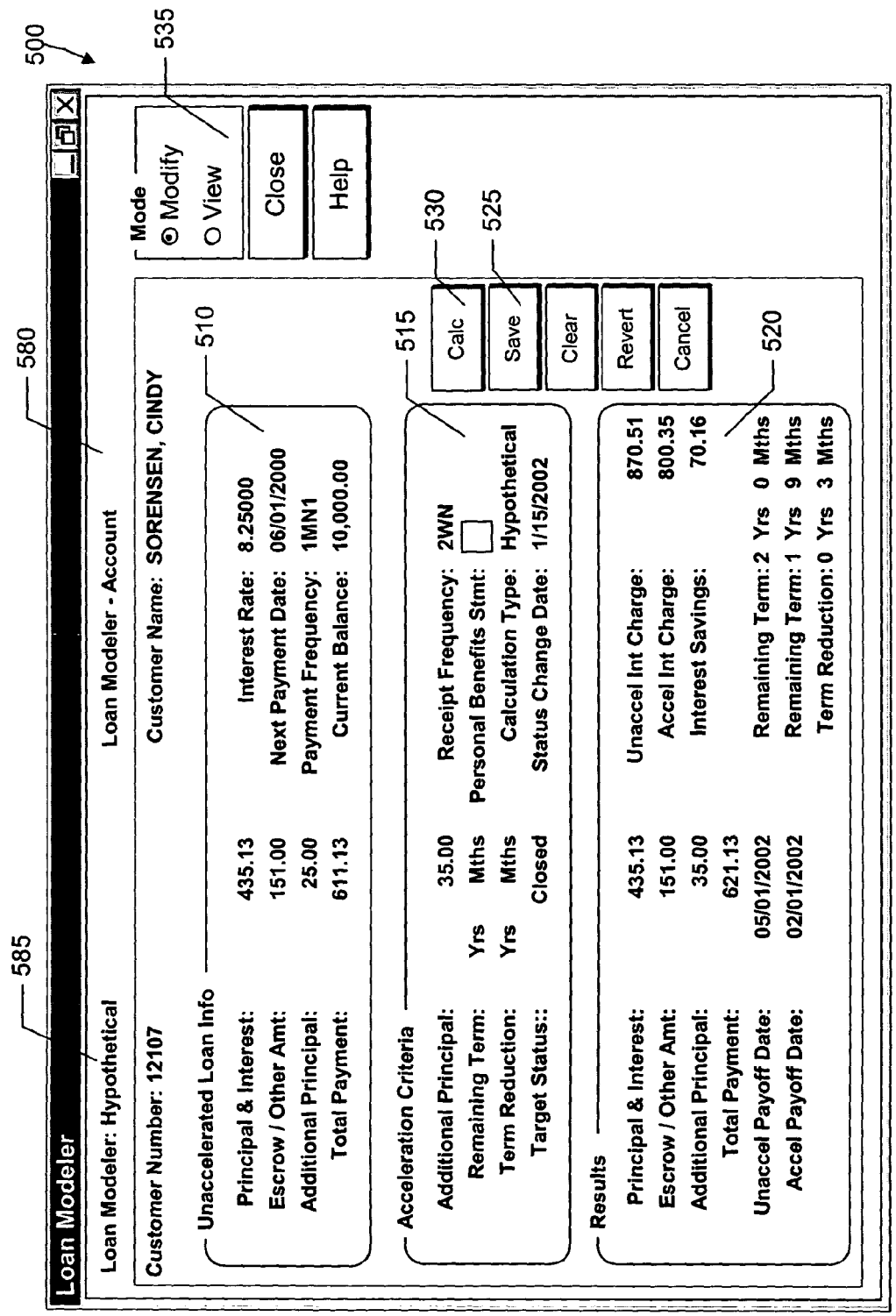

Once data has been provided in the various fields, a calculation button 530 can be pressed to cause the information to be incorporated into the customized loan. Further, the process can be iterative and allow the customer to make a series of modifications until they get what they desire. At any point, the iterative process can be saved by pressing a save button 525. Results field 520 includes various modifications to the basic loan described above. Results field 520 is populated upon pressing calculation button 530. The iterative process of providing planning characteristics and receiving and viewing results are illustrated in blocks 215, 220, 225 and 230 of FIG. 2. Referring to FIG. 6, financial planning tool 500 is illustrated with the various fields populated upon pressing calculation button 530 in the modify mode.

Figure 7:
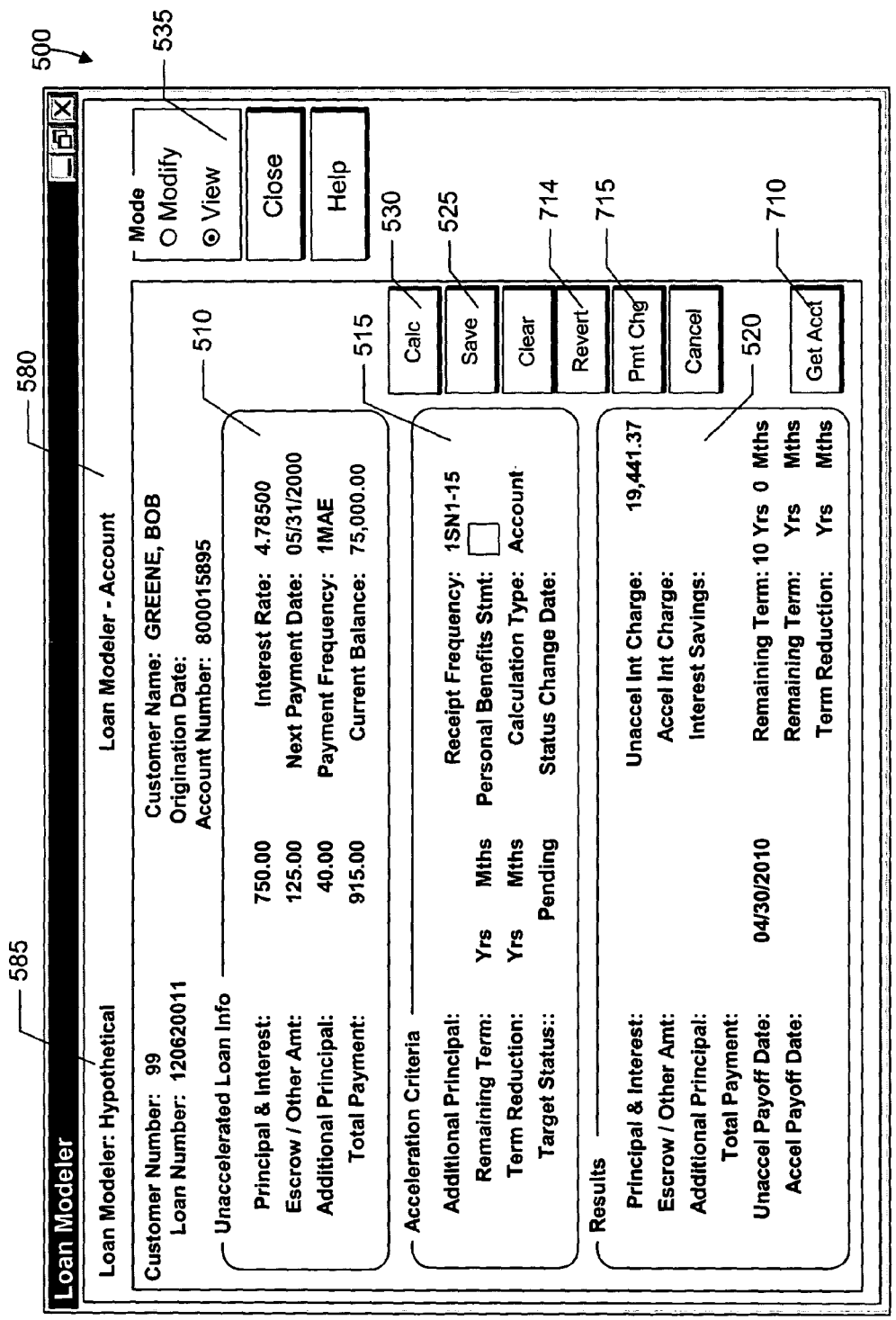

In contrast, FIG. 7 illustrates financial planning tool 500 with loan modeler interface 580 selected. As illustrated, loan modeler interface 580 includes a payment change button 715, a revert button 710, and a get account button 710. Get account button 710 causes the basic account to be updated in basic account field 510 from account information either held by account customization entity 130 or obtained from an entity maintaining the account, such as, investment maintenance servicing entity 160 or loan maintenance servicing entity 150.

Payment change button 715 can cause the planning characteristics to be implemented to customize the basic account, and revert button 715 can cause a previously customized account to be modified back to the basic account. These processes are further described below in relation to blocks 245, 250, 255, and 260 of FIG. 2.

Referring again to FIG. 2, planning characteristics identified using financial planning products offered by account customization entity 130, or imported from third party tools operated on a customer's computer can be incorporated into a planning tool offered by account customization entity 130 (block 215). Such planning characteristics can include a static payment, a payment period, an excess principal payment amount, a proposed conclusion date for a loan, a proposed retirement date, a proposed investment, a periodic investment amount, a period for the investment, an acceleration in a payment or investment amount, and the like.

In some embodiments where the planning characteristics are derived from a financial planning product offered by account customization entity 130, the financial planning product and the planning tool are incorporated into a common product. Thus, the planning and incorporation can be performed in the same step using the same tool. In other embodiments, the planning tool is separate from the financial planning product. In this way, a customer is free to identify a plan without the influence of any representative of account customization entity 130. Rather, the planning characteristics identified by the customer can be uploaded to the financial planning tool, and subjected to only minor manipulation, if any, under the direction of a representative of account customization entity 130.

The results of incorporating the planning characteristics into the planning tool are then provided to the customer (block 220). In some embodiments, these results are provided to the customer via the Internet. However, based on the disclosure provided herein, one of ordinary skill in the art will recognize other ways of providing such information to the customer in accordance with the present invention. The customer can then either accept or reject the modifications provided as part of the projected results (block 225). In one particular embodiment, the customer accepts the results by pressing a payment change, or account change button provided as part of an interactive interface.

Where the results are not as desired, one or more variables associated with the plan can be modified (block 230), incorporated into the planning tool (block 215), and results projected in relation to the modifications presented (block 220). Such results can then be evaluated (block 225) and either accepted, or again modified.

The results can now be applied to the existing loan or investment, such that an account associated with the existing loan or investment operates in accordance with the determined results. In relation to implementing the results, account customization entity 130 is authorized to access the account at issue, and/or an account from which money will be transferred to/from the account at issue (block 235). Such authorization can be performed by a variety of mechanisms including, but not limited to, having account owner 120 sign a release authorizing access to the account by account customization entity 130. In another embodiment, account authorization is performed in accordance with a novel authorization method disclosed below in relation to FIG. 10.

In addition, variables to be held constant in relation to the projected results are identified (block 240). Thus, for example, where the account is a loan to be paid off, the constant variables identified can include the time to payoff the loan, the periodic payment of the loan, the period of the payment on the loan, and/or the like. Alternatively, where the account is an investment, the constant variables can include a periodic infusion of funds, a period of the infusion, a periodic withdrawal of funds, a period of the withdrawal, a fixed point in time where a desired amount will be available, and/or the like.

With the constant variables identified, the plan can be implemented in relation to the account or accounts (block 245). As just one example of an implementation where the account is a mortgage, the plan may include making a fixed payment amount at a period that coincides with when account owner 120 receives a recurring paycheck from their employer. Thus, the employer can deposit the amount of the paycheck into a savings account of account owner 120. In turn, account customization entity 130, having been authorized to access both the mortgage account and the savings account, withdrawals funds from the savings account at some time after the employer has deposited the paycheck and transfers the funds to satisfy the mortgage account. Thus, where the mortgage account calls for a monthly payment, the monthly payment period can be modified to a payment period coinciding with when account owner 120 receives paychecks for employment. In some cases, other variables of the mortgage remain the same, including the time to pay the loan off, the total interest paid over the life of the mortgage, and the like.

In another example, the plan may include making a payment amount at a period defined by the mortgage, where the payment amount is adjusted such that the mortgage is paid off at a fixed point in time that is different from the original term of the mortgage. To do this, account customization entity 130 withdrawals funds from a savings account associated with account owner 120 and applies them to the mortgage. The amount withdrawn is sufficient to cause the mortgage to be paid off at the fixed point in time. Based on the disclosure provided herein, one of ordinary skill in the art will recognize other approaches based on differing constant variables, and/or combinations thereof. For example, it is possible to change the period of a recurring payment and the amount of the recurring payment such that a mortgage is paid off at a fixed point in time.

As yet another example, the account to be customized may be an investment account. As such, the variables to be maintained as constant can include the periods at which recurring investments are made, and the total amount of an investment to be achieved at a fixed point in time. Thus, at the identified period in time, account customization entity 130 withdrawals funds from a savings account associated with account owner 120, and transfers the funds to the identified investment account. The amount of funds transferred can be equivalent to an amount required to be deposited on a recurring basis to reach the end goal based on a presumed return on investment. Where the return on investment is fixed, it is possible for the amount to be constant. However, where the return on investment varies, the amount and/or the period of the infusion of additional funds into the investment account can be adjusted.

Based on the disclosure provided herein, one of ordinary skill in the art will recognize many other applications of the present invention to investment accounts. For example, a reversed situation may be desired where a fixed amount of funds are to be available in an investment account at a determined point in time, while funds are withdrawn from the account on a recurring basis. Thus, account customization entity 130 withdrawals funds from the investment account on a periodic basis and provides the funds to account owner 120. The amount of funds withdrawn are based on the presumed or fixed rate of return, and the desired amount available at the endpoint. Thus, using account customization entity 130, a variable annuity can be created from a standard investment account.

With the plan implemented (block 245), it remains to monitor, and if necessary adjust the plan to assure that the desired constants remain constant. To do this, the customized account is queried to determine if various characteristics associated with the account have changed (block 250). If the characteristics have been changed, it may be necessary to adjust the plan implementation such that desired constants are achieved (block 260). Thus, as just one example, where the plan involves a variable rate mortgage it may be found that the interest rate of the mortgage has been increased. This increase in the interest rate may require that the plan be adjusted to meet some desired goal. For example, where the desired goal is to payoff the mortgage at a fixed point in time the amount of the recurring payment can be increased to assure that the desired goal is met in light of the increase in the mortgage amount. Alternatively, the frequency of the payment may be increased, or any other modification may be made. Based on this, one of ordinary skill in the art will recognize various modifications possible to assure that desired results are achieved.

As another example, it may be determined that a return on an investment is lower that previously presumed (block 250). Thus, to assure that a determined amount is available at a determined time, the amount periodically invested in the investment account may be increased (block 260). Based on this, one of ordinary skill in the art will recognize many other modifications that are possible.

Further, it should be noted that adjustments can be limited. For example, where the investment account is a mutual fund that for one period had a return on investment of fifty percent, and a return on investment of ten percent for the subsequent period, the amount of the periodic investment is not necessarily increased the full amount to accommodate the dramatic decrease in return. Rather, the amount may be increased to accommodate some of the decrease in return, and the plan is allowed to run in the red for a period. When a later increase in return is realized, the amount is not reduced, or is not reduced as significantly as it would have been if the account was not running in the red. This limit on the reduction in the periodic investment allows for the account to be brought back out of the red. Such an approach of limiting adjustments avoids the situation where potentially unlimited amounts must be immediately forwarded to assure the plan is maintained in the black. In some cases, however, such limits may not be necessary where limits already exist in the amount that account characteristics can change. Thus, for example, where the investment account holds non-volatile securities, the non-volatility of the held securities may be sufficient assurance that any adjustment will not be overwhelming.

In addition, account owner 120 may be queried to determine if they would like to modify the plan (block 255). This ability to modify the plan allows for account owner 120 to modify the plan to meet new needs or desired results. Thus, for example, account owner 120 may get a significant pay increase associated with their employment and may desire to payoff a mortgage sooner. This can be accommodated by changing the desired-payoff point, and re-implementing the plan to achieve the desired payoff point. Alternatively, where an adjustment (block 260) is required to meet an existing plan, the plan can be changed to control the implementation of any adjustment. Thus, for example, where an adjustment will double the amount of periodic investments, the plan can be changed to reflect different goals such that the periodic investment does not need to double.

Figure 8:
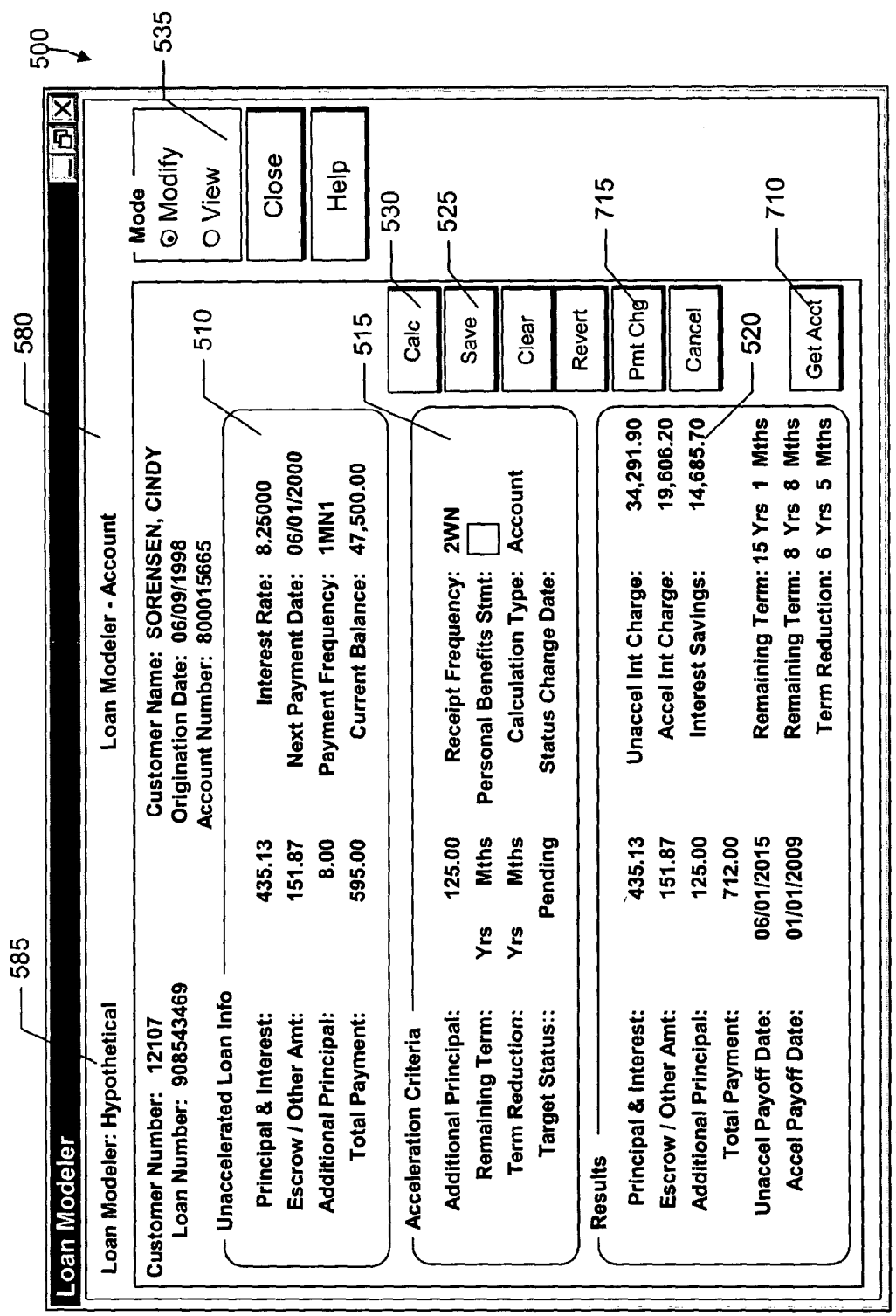

Referring to FIG. 8, an embodiment of the present invention for interactively identifying and implementing a plan is illustrated as a flow diagram 900. Following flow diagram 900, account customization entity 130 receives the identity of account owner 120 (block 905). In some cases, this is accomplished where account owner 120 contacts account customization entity 130 via communication network 110 and provides the information. The information can include the name, social security number, account number, customer number, and/or the like for account owner 120. This information is used by account customization entity 130 to determine if account owner 120 has previously created a record (block 910). Where such a record of account owner 120 does not exist, an account record can be created (block 920). Creating the account record can include providing information about account owner 120 including, but not limited to, name, contact information, age, marital status, income information, and/or the like. Further, information about an account to be customized can be obtained including, but not limited to, type of account, entity maintaining the account, account number, characteristics of the account including returns, interest rates, inception of the account, required payments and periods thereof, and the like. All of this information can then be stored to a database in a way that it is linked to account owner 120. Information about an account is also transferred to a planning tool where it can be manipulated (block 935).

In some cases, information may be provided that allows account owner 120 to utilize tools provided by account customization entity 130 to examine "what if" scenarios. In such cases, account number and other private information is not fundamental and may not be gathered by account customization entity 130. This allows a potential customer to investigate various possibilities available through account customization entity 130, without providing sensitive information.

In some cases, the "what if" scenarios investigated by account owner 120 are converted to a plan that is implemented in relation to one or more accounts of account owner 120. In such cases, access to the various accounts related to implementing the plan will necessitate that account owner 120 provide account numbers and specifics associated with the accounts, as well as authorization to access the accounts.

Where such a record of account owner 120 already exists (block 910), it is determined if the record identifies an account, and whether account customization entity 130 is authorized to access the account (915). Where account customization entity is not authorized to access the account, account information in the record is opened (block 930). The account information may simply be a "what if" scenario developed by account owner 120 in a prior session. This information can be transferred to a planning tool where the information can be manipulated to further develop the "what if" scenario (block 935).

Alternatively, where account customization entity 130 has actual account information and is authorized the account(s), the actual account can be queried to obtain the most up to date information (block 925). This information can include account balances, interest in arrears, period of payments, term until payoff, return on investment, and/or the like. This information can be transferred to a planning tool where it can be further manipulated (block 935).

The information can be incorporated into the planning tool in a variety of ways (block 935). For example, the information may be imported from the record associated with account owner 120 according to designations that are related to fields in the planning tool. Thus, for example, the fields may include account type, return on investment or interest rate, account balance, fees associated with the account such as escrow funds or IRA fees, and the like. Information from these fields in the record are then used to populate corresponding fields in the planning tool.

With the fields in the planning tool populated with account information, the planning tool can be used to manipulate the account information to formulate a plan for customizing the account (block 940). For example, the amount of a recurring payment can be modified and the effects on the timing of a payoff, or the growth of an investment account evaluated. Other modifications can also be made, and the effects on other characteristics of the account evaluated. Upon each manipulation, the results of the manipulation are displayed for the consideration of account owner 120 (block 945). If other manipulations are desired (block 950), the process can be repeated from the point of the last manipulation. In this way, account owner 120 can continue to modify account parameters until a desired account customization is achieved.

Once the desired result is achieved, it is determined if account customization entity 130 has access to the account(s) related to implementing the desired plan (block 955). Where account customization entity 130 does not have such authorization, the authorization can be provided, or the session including the desired plan is saved in the record associated with account owner 120 for access at a later time (block 965). Alternatively, where account customization entity does have access to the account(s) related to the desired customization, account owner 120 is queried to determine if they would like to implement the desired customization (block 960). Where it is not desired to implement the customization, the session is saved as previously discussed (block 965).

Alternatively, where it is desired to implement the customization, the proposed account changes are compared to business rules associated with the account(s) involved and either approved or disapproved (block 970). In some cases, block 940, 945, and 950 are repeated to get the plan such that it can be approved. Once the plan is approved, the account is modified in accordance with the plan (block 975). Such modification can include making transfers to/from a savings account associated with account owner 120 to/from an investment or loan account associated with account owner 120.

Figure 9:
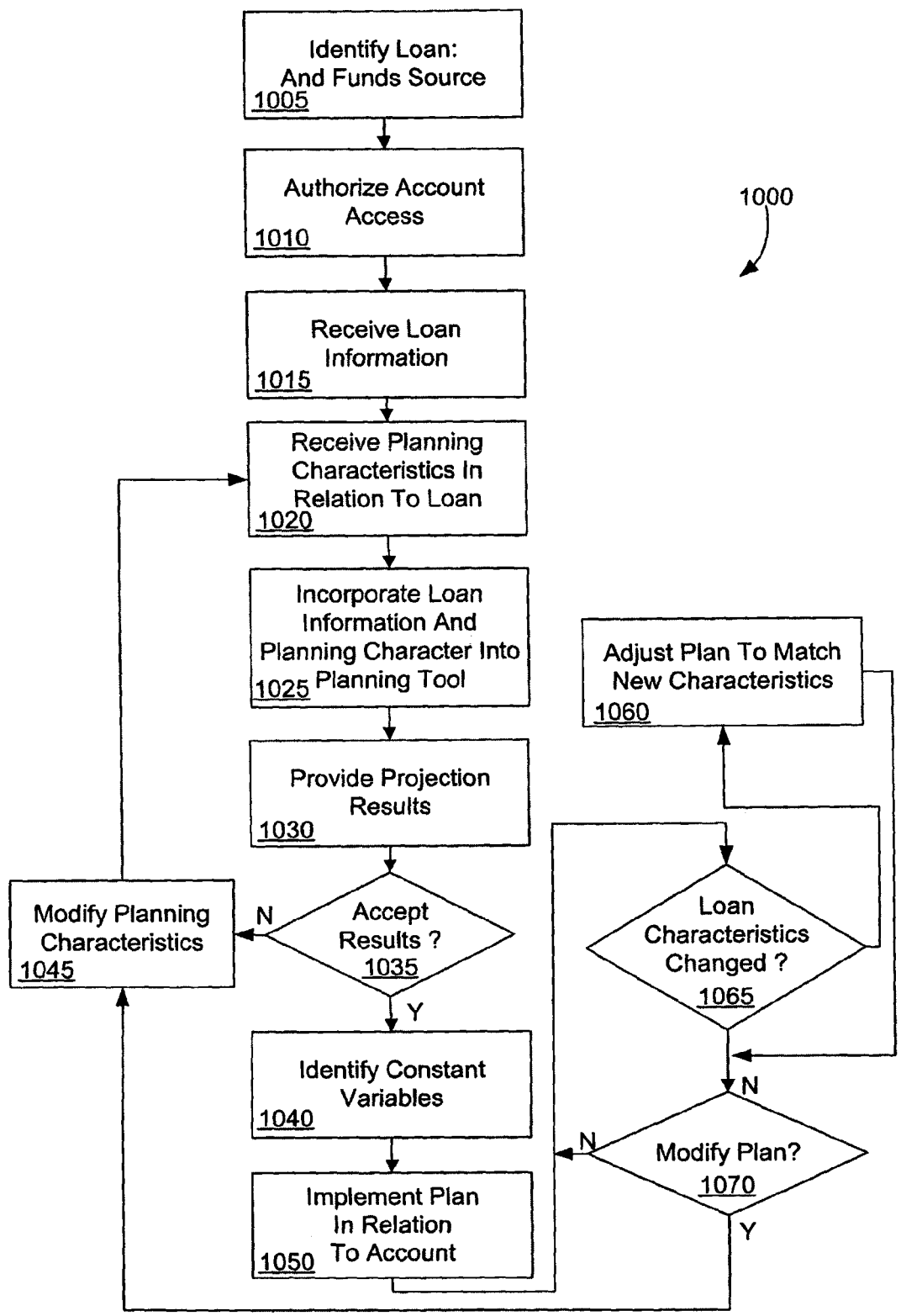
FIG. 9 is a flow diagram illustrating a method in accordance with various embodiments of the present invention for tailoring a loan to the needs of an account owner.

Referring to FIG. 9, a flow diagram 1000 illustrates an embodiment for customizing a loan in accordance with the present invention. Following flow diagram 1000, a funds source and a loan to be customized are identified (block 1005). In one particular embodiment, the loan is a mortgage loan and the funds source is a savings account with direct deposit from an employer of account owner 120. Based on the disclosure provided herein, however, one of ordinary skill in the art will recognize a number of other loans and/or funds sources that can be used in relation to the present invention. Such identification can include account owner 120 providing account numbers and information about the entities holding the accounts to account customization entity 130.

In addition, account customization entity 130 can be authorized to access the account(s) (block 1010). As with previous embodiments, such authorization can be provided by securing the signature of account owner 120, while in other embodiments, such authorization is achieved as discussed in relation to FIG. 10 below. With authorization to access the account(s), account customization entity 130 can access the account(s) and retrieve information about the account(s) (block 1015). Such information can include an interest rate of a mortgage loan, whether the interest rate is fixed or variable, an escrow amount associated with the mortgage loan, individual components that comprise the escrow amounts including property insurance, taxes, and the like. Other information can include the term of the loan, the due date of any recurring payments, and the like.

Further, planning characteristics can be received in relation to the loan account (block 1020). Such planning characteristics can be those discussed above in relation to other embodiments of the present invention. For example, the planning characteristics can be a fixed payment amount that recurs at a fixed time, or a fixed payoff date for the loan. The loan information and the planning characteristics can be incorporated into a planning tool (block 1025). The planning tool can provide projected results based on the planning characteristics (block 1030). Such results can include a projected payoff date based on a desired recurring payment, a projected recurring payment based on a desired payoff date, and the like.

Account owner 120 may either accept or reject the provided results (block 1035). Where the projected results are not accepted, the planning characteristics can be modified (block 1045) and the results again projected based on the modified characteristics. In this way, account owner 120 can interactively develop a plan for customizing the loan at issue. Thus, for example, account owner 120 may initially input a desired payoff date and find out that the required payment is too high. From that point, account owner 120 can select a later payoff date, or even a maximum payment and look at the results from that.

Once the results are accepted (block 1035), the constant variables are identified (block 1040). Thus, for example, if the proposed plan calls for a payoff at a particular date, the payoff date can be identified as a constant variable. Alternatively, where the payment amount is fixed, it can be identified as the constant variable. With the constant variables identified, the plan can be implemented in relation to the loan (block 1050).

With the plan implemented, the progress of the loan account can be monitored. This monitoring includes monitoring the characteristics of the loan to assure that they conform with the plan (block 1065). For example, it can be determined if the interest rate associated with a variable rate mortgage has changed, whether a required payment amount has changed, whether escrow amounts associated with a mortgage have changed, and the like.

In one particular embodiment, the loan is an adjustable rate mortgage where the plan calls for making excess principal payments. The excess principal payments can be made by increasing the frequency of recurring payments, by adding additional funds to recurring payments, or a combination thereof. Each year the holder of the mortgage adjusts the interest rate under which the loan is offered, and the recurring payment to match the interest rate. Further, the recurring payment is adjusted to compensate for any excess principal payments made during a preceding year. Therefor, the recurring payment is adjusted such that the loan will be paid off at the endpoint of the loan's original term. This is often contrary to account owner 120 that would like to pay the loan off earlier.

To counteract this, the change in characteristic (the payment due and the new interest rate) are identified. From this, the changes in the characteristics are used to adjust the plan such that the constant variables remain constant (block 1060). Thus, for example, where the payoff point of the loan is to remain constant, the recurring payment is adjusted to match the payoff date. Alternatively, where the payment is to remain at a constant level, the payment is adjusted to the constant level.

In addition, it can be determined if account owner 120 would like to adjust the plan (block 1070). Where such is desired, the plan can be adjusted (block 1045) and the adjusted plan implemented. Alternatively, where there is no desire to adjust the plan (block 1070), the loan account remains monitored to assure that the plan as previously defined is implemented (block 1065).

Figure 10:
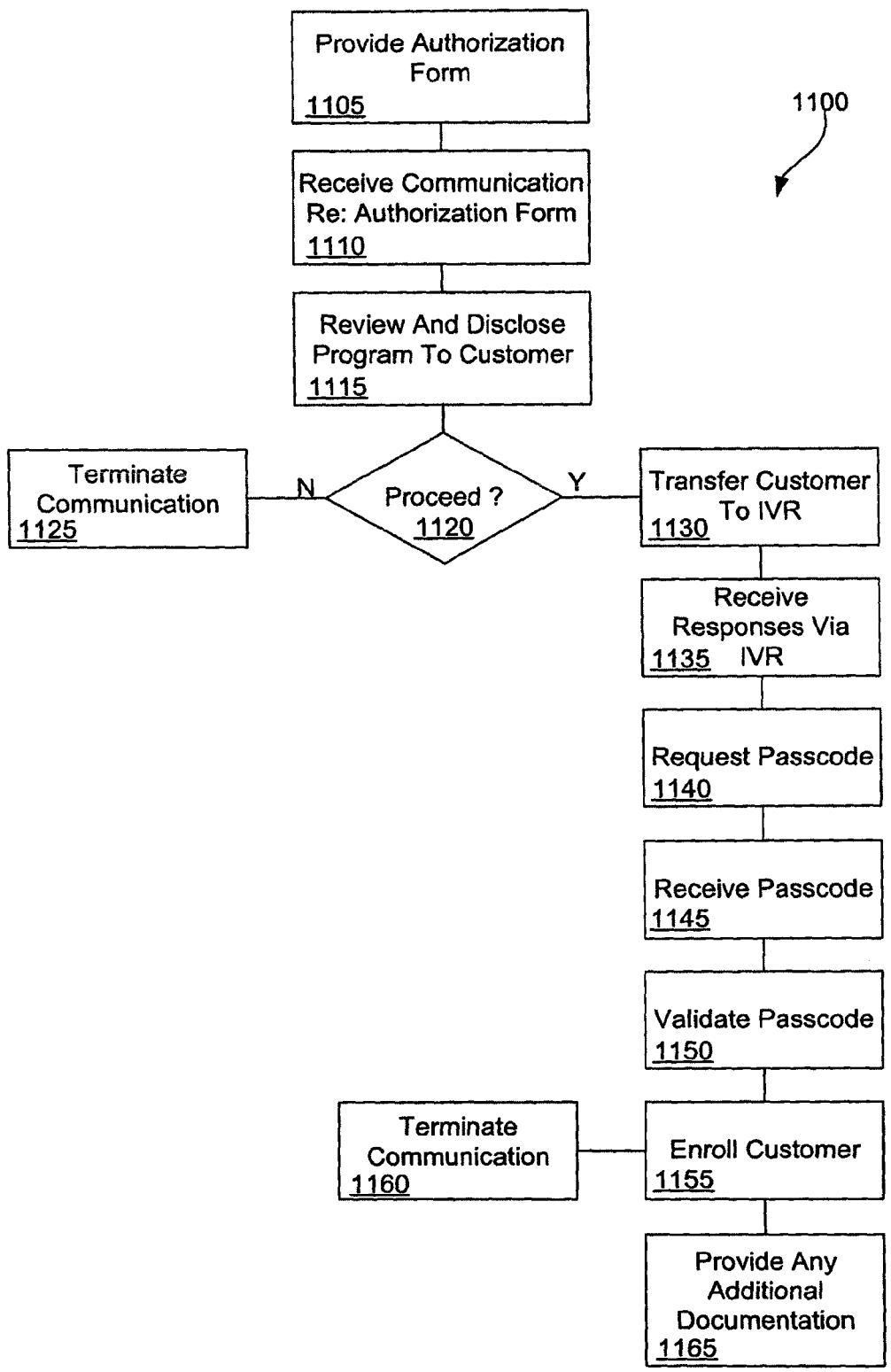
FIG. 10 is a flow diagram illustrating a method in accordance with embodiments of the present invention for authorizing access to one or more accounts.

Referring to FIG. 10, a flow diagram 1100 illustrates a method in accordance with the present invention for authorizing access to one or more accounts. Following flow diagram 1100, an authorization form is provided to account owner 120 (block 1105). Such an authorization form can be provided by regular mail to an address presumed to be that of account owner 120, or by electronic mail and again to an destination address presumed to be that of account owner 120.

FIG. 11 illustrates an exemplary embodiment of an authorization form 1200 that can be used in accordance with flow diagram 1100. Authorization form 1200 includes an enrollment passcode 1205 incorporated on an enrollment card that can be any copy, paper form, and/or visual display. Authorization form 1200 further includes information 1215 on the form that clearly designates the purpose of the form as being for authorization for accessing one or more accounts. To this end, authorization form 1200 includes clearly and conspicuously stated terms 1220 of any account access. Such terms include a revocation provision 1230 indicating that account owner 120 can revoke any authorization previously made. As illustrated, authorization form 1200 can include instructions for providing authorization via a telephone network 1250 (or other electronic means), or physically 1240 by sending form 1200 in with the appropriate signature.

Referring again to FIG. 10, communication is received in regards to the authorization form (block 1110). In some embodiments, such communication is not initiated by account customization entity 130, but rather by account owner 120, or someone on its behalf. In some cases, the communication is received via telephone, while in other instances the communication is received via the Internet. In one particular embodiment, the communication is received using a Voice Over Internet Protocol. It should be noted, however, that based on the disclosure provided herein, one of ordinary skill in the art will recognize various other ways of receiving such communication.

Upon receiving the communication, account owner 120 is provided with information about the account authorization they are about to provide (block 1115). In one particular instance, a human operator representing account customization entity 130 discusses various products offered via account customization entity 130. Such products can include mortgage acceleration programs, recurring investment programs, and/or other programs involving account customization as previously described. The human operator then asks if account owner 120 is interested in utilizing any of the products which will require authorization by account owner 120 for account customization entity 130 to access one or more accounts associated with account owner 120 (block 1120).

Where account owner 120 declines, the communication is terminated (block 1125). Alternatively, where account owner 120 accepts, account owner 120 is transferred to an interactive voice response system (block 1130). In one particular case, the following message is provided to account owner 120: "I am now going to conference you into our interactive voice response system that you can use to authorize transfers under the equity accelerator program. Just follow the recorded directions and enter the requested information electronically using the keypad on your telephone. Although I won't be participating in the authorization process, I will remain on the line while you complete the process." Such a statement points out that in some embodiments, the authorization process is entirely electronic and is not oral. In addition, the statement complies with various privacy laws that require alerting a person on the telephone to the situation where another is monitoring the call.

Once transferred to the interactive voice response system, an indication of such is provided to account owner 120. One such welcome message can include: "Welcome to the equity accelerator authorization system. This system allows you to authorize your participation in the equity accelerator program electronically by using your touch-tone telephone. You may exit the authorization system at any time by pressing the star key." In some instances, the term phone enroll is specifically not used to avoid any suggestion that the authorization is an oral telephonic authorization. Rather, it can be sought to assure that account owner 120 understands that it is an electronic authorization.

With account owner 120 introduced into the interactive voice response system, a number of prompts can be provided and responses thereto received (block 1135). One such prompt is as follows: "As you know, you received a letter that explains how the equity acceleration program works. The letter was accompanied by an enrollment card that includes a written authorization. Please press '1' to confirm that you received and have read the letter, including the authorization provision." In this way, it is verified that a copy of the terms of the authorization has been provided to account owner 120 in either electronic or written form.

Next, account owner 120 is asked to provide a passcode provided on the written authorization form (block 1140). The passcode is only available on the printed authorization form, and is not available from the human operator that is listening in on the interaction. Thus, reception of the passcode provides a degree of security that account owner 120 received the written authorization form that was provided to an address known to be frequented by account owner 120. In addition, in some embodiments, there is not any way for the human operator to provide the information. Thus, a human operator does not have any ability to enroll account owner 120 without their permission.

The following prompt provides an example of requesting the passcode from account owner 120: "You will be asked to enter the enrollment passcode provided on the letter that was sent to you. By entering the enrollment passcode, you will identify yourself for purposes of the equity accelerator program and authorize your lender or its agent to initiate transfers from your bank account to make payments on your mortgage on the terms set forth in the written authorization included in the letter that your received discussing the program. This enrollment passcode will be your electronic signature identifying you and authorizing the transfers on those terms, and an electronic record of your authorization will be maintained by the program. When you are ready to begin, please press '1'." Such a prompt allows for authorization even though the enrollment passcode does not necessarily originate from the entity maintaining the account to be accessed. Further, such a prompt evidences the account owner's identity where the passcode is only available from the solicitation letter previously mailed to the address of account owner 120.

Having prepared account owner 120, they are prompted to enter the passcode. The following prompt provides an example: "Please enter the enrollment passcode followed by the pound sign to identify yourself for purposes of the program and toy authorize the transfers on the terms set forth in the written authorization included in the letter."

The passcode is received via the interactive voice response system (block 1145), and checked to assure that it is a valid passcode (block 1150). The passcode may be validated by assuring that information garnered by the human operator is consistent with the passcode, or that the person's name is that associated with the passcode. Based on the disclosure provided herein, one of ordinary skill in the art will recognize a variety of approaches to validate the passcode. Based on reception of the passcode, account owner 120 is enrolled (block 1155). Upon enrollment, the following prompt may also be used: "Your authorization has been completed. Thank you for using our electronic authorization system. Please remain on the line with our representative to hear additional important information about the program." The human operator can then enter the conversation and finish any communication with account owner 120. After such, the communication is terminated (block 1160). In some cases, additional information is forwarded to account owner 120. Such additional information can be a confirmation of the enrollment or other such information (block 1165).

Referring to FIG. 12, a flow diagram 1200 illustrates a method of account customization in accordance with the present invention, where an additional account is added to a previously customized account. It will be recognized that the method is similar to that of flow diagram 200 with the exception of the modifications related to dealing with the customization of multiple accounts. Specifically, blocks 215-230, 240, 255 and 260 are the same. Blocks 235, 245 and 250 have been modified to note that two or more accounts are part of the account customization. Thus, when account authorization is performed (block 235), it may be that multiple accounts are authorized, or just the recently added account. Further, the planned customization is implemented in relation to the multiple accounts (block 245), and changes in one or more of the multiple accounts may cause a change in characteristics resulting in a modification of the plan (block 260).

Following flow diagram 1200, a loan is added to an existing account customization (block 1205). Thus, for example, a customer may have previously performed a customization of a mortgage, and now would like to add a car loan to the customization making it a multi-account customization. To do this, the customer would identify the prior customized mortgage, as well as the car loan that is to be added. It should be noted that while the explanation of flow diagram 1200 is provided in relation to debts or loans, investments could also be addressed using similar approaches.

Once the loans to be grouped have been identified (block 1205), it is determined if the previous customization can be applied without modification (block 1207). As an example, the previous plan may have called for making an extra twenty percent principal payment at each pay period. Thus, when the new loan is added, the amount of the payment simply goes up by the amount of the loan plus twenty percent. This does not require providing additional planning characteristics, but rather, the existing planning characteristics are used as previously described in relation to flow diagram 200 (blocks 215-260).

Alternatively, where a new plan is to be implemented, new planning characteristics in relation to the group of accounts are received (block 1210). Such characteristics can be, for example, to be completely out of debt in five years. This results in payment modifications to one or more of the accounts in the group of accounts. As another example, the characteristics can include making an extra principal payment each pay period, but distributing that payment such that interest charges are minimized, and/or tax advantages are maximized. Once the additional planning characteristics in relation to the group of accounts are provided, the plan is implemented much as described in relation to flow diagram 200 above except that transfers are planned, monitored, and effectuated in relation to multiple accounts (blocks 215-260). Based on the disclosure provided herein, one of ordinary skill in the art will recognize a myriad of characteristics that can be customized in relation to a group of accounts.

The invention has now been described in detail for purposes of clarity and understanding. However, it will be appreciated that certain changes and modifications may be practiced within the scope of the appended claims. Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A computer-implemented method for implementing a variable financial plan, the method comprising:

identifying an account;

accessing a computerized account planning tool, wherein the account planning tool is an investment projection tool;

presenting a characteristic associated with the account to the account planning tool;

receiving an account plan from the account planning tool;

authorizing access to a bank account, wherein authorizing access to the bank account comprises an account owner initiating a phone call and providing a predetermined passcode to a host computer;

based at least in part on the account plan, facilitating a funds transfer from a bank account to the account, wherein transferring funds from the bank account to the first account can recur in accordance with the account plan in the absence of additional authorization;

monitoring activity in the account using a computer, wherein monitoring activity in the account includes identifying a change in a projected rate of growth of the investment account;

modifying the account plan in response to the activity;

performing a plurality of funds transfers from the source of funds to the account in accordance with the account plan, wherein at least one funds transfer occurs prior to modifying the account plan, and another occurs after modifying the account plan;

adding an additional account to the financial plan; and customizing the combination of the additional account and the account.

2. A computer-implemented method for directing recurring financial transfer operations, the method comprising:

using a computerized account planning tool, preparing an account plan, wherein the account plan indicates transferring funds to an account associated with the account plan;

identifying an account plan variable, wherein the account plan variable is an amount of a periodic funds transfer;

monitoring activity in the account;

modifying the account plan to maintain the account plan variable within a range;

providing an account planning tool, wherein the account planning tool is a mortgage planning tool, and wherein the account planning tool is used in preparing the account plan; and wherein the account is a mortgage account, and wherein monitoring activity in the mortgage account includes identifying a change in one or more characteristics of the mortgage associated with the mortgage account.

3. The method of claim 2, wherein the account is a first account, the method further comprising:

identifying a second account, wherein the account plan indicates transferring funds from the second account to the first account.

4. The method of claim 3, the method further comprising:

performing a plurality of funds transfers from the second account to the first account in accordance with the account plan, wherein at least one funds transfer occurs prior to modifying the account plan, and another occurs after modifying the account plan.

5. The method of claim 3, the method further comprising:

facilitating one or more funds transfers in accordance with the account plan, wherein the funds transfers are performed by a loan maintenance organization.

6. The method of claim 3, the method further comprising:

authorizing access to the first and the second accounts, wherein transferring funds from the second account to the first account can recur in accordance with the account plan in the absence of additional authorization.

7. The method of claim 2, the method further comprising:

adding an additional account to the account; and customizing the combination of the additional account and the account.

* * * * *